Nov. 3, 1936.    C. H. HAPGOOD    2,059,340
MECHANISM FOR OPERATING MILKING MACHINE VALVES
Filed Dec. 23, 1931    2 Sheets-Sheet 1
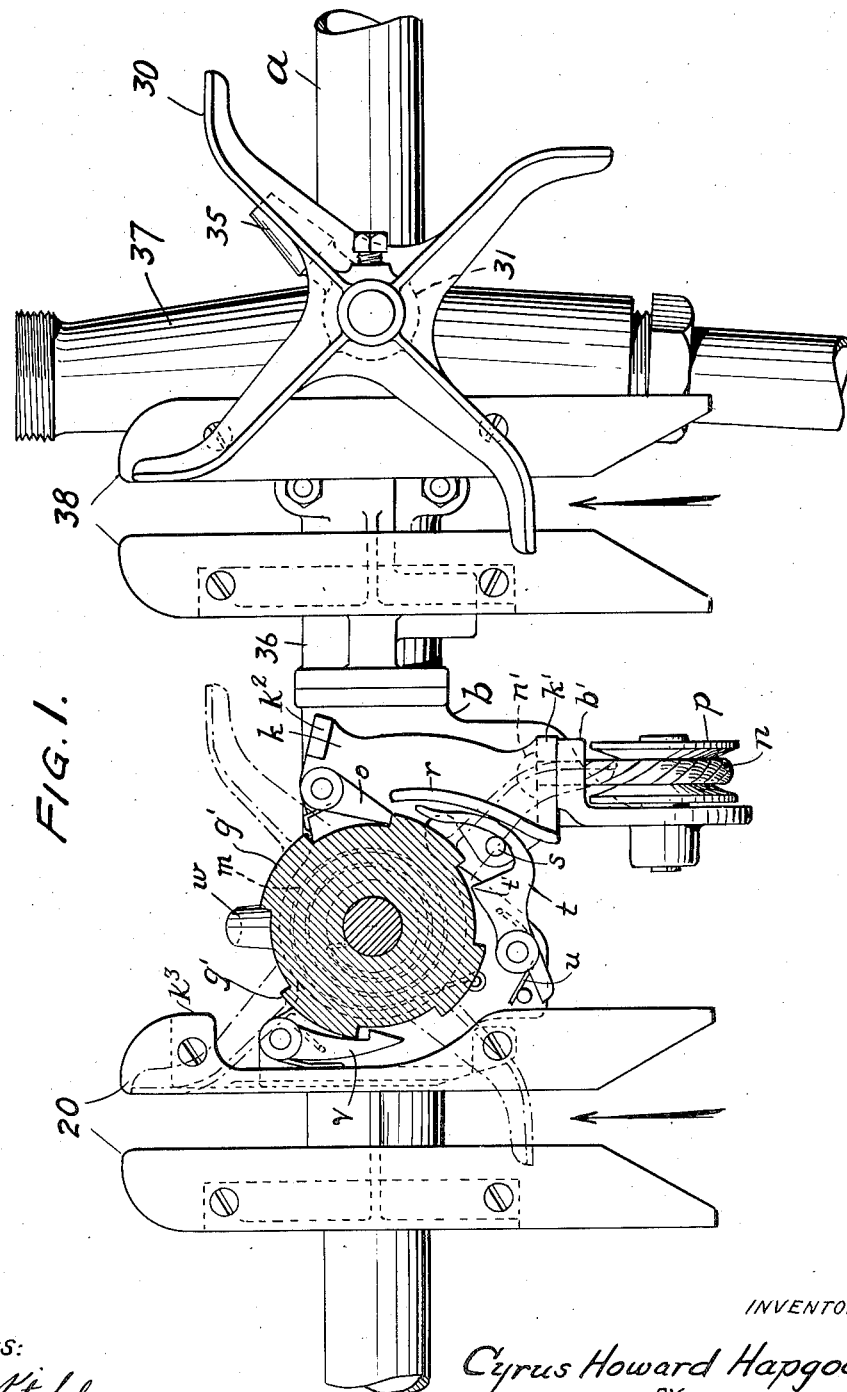
WITNESS:
INVENTOR
Cyrus Howard Hapgood
BY
Busser and Harding
ATTORNEYS.

Nov. 3, 1936.    C. H. HAPGOOD    2,059,340
MECHANISM FOR OPERATING MILKING MACHINE VALVES
Filed Dec. 23, 1931    2 Sheets-Sheet 2
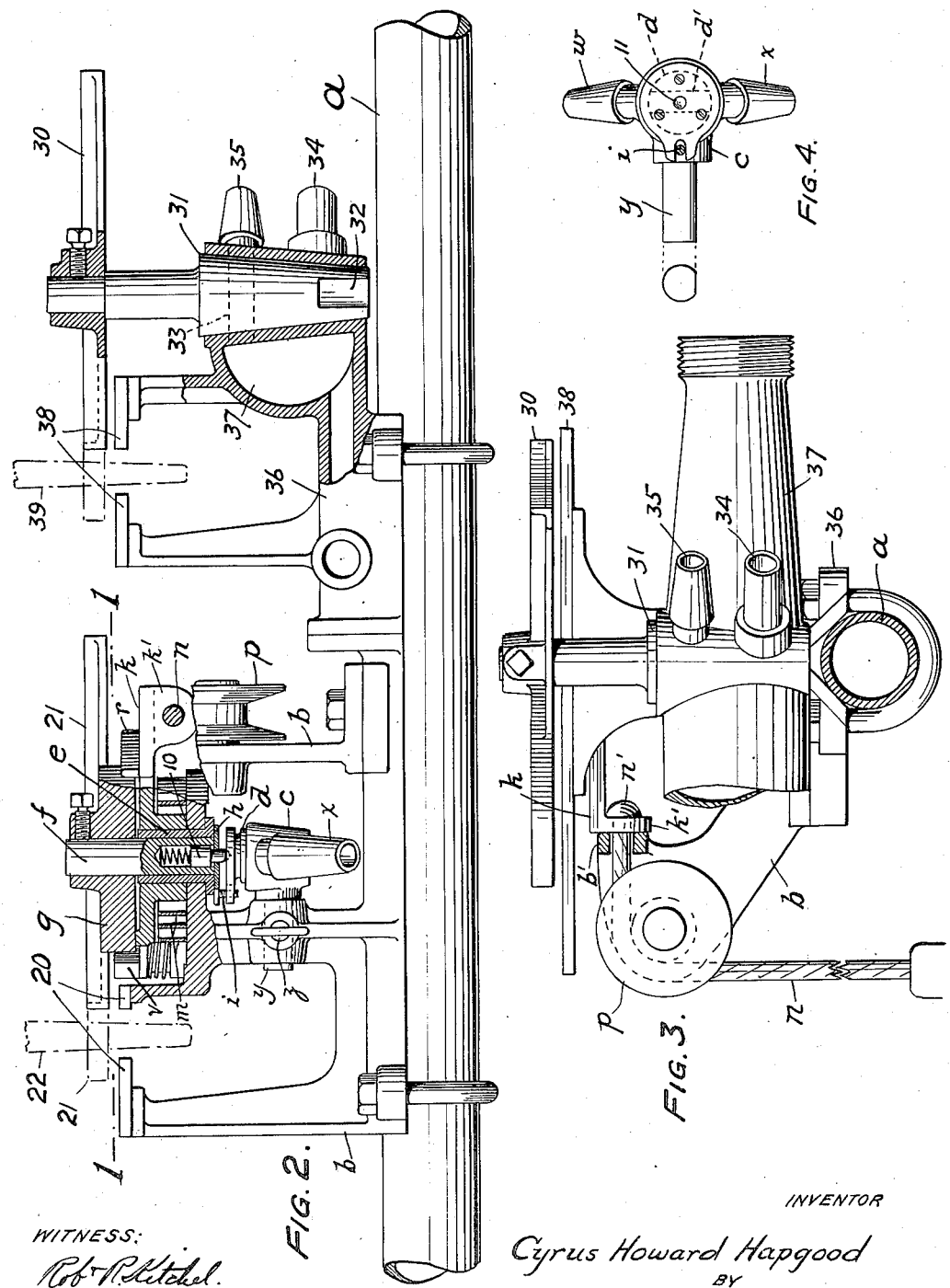
WITNESS:
Rob't P. Kitchel.
INVENTOR
Cyrus Howard Hapgood
BY
Busser and Harding
ATTORNEYS.

Patented Nov. 3, 1936

2,059,340

UNITED STATES PATENT OFFICE 2,059,340

MECHANISM FOR OPERATING MILKING MACHINE VALVES

Cyrus Howard Hapgood, Nutley, N. J., assignor to The De Laval Separator Company, New York, N. Y., a corporation of New Jersey Application December 23, 1931, Serial No. 582,774

12 Claims. (Cl. 137—139)

In a patent issued to me December 30, 1930, No. 1,787,152, for a cow-milking apparatus, there are set forth a rotary platform adapted to carry cows to be successively milked, milking machinery comprising a number of milking units on the platform adapted to be operatively connected with the teats of a corresponding number of cows, and stationary means which engage said milking units as the platform revolves and render them successively operative.

Each milking unit comprises a milk pail, a set of teat cups each having an inner milk chamber and an outer inflation or pulsation chamber, and a set of valves each operable by a wheel. One valve controls the connection of the corresponding pail with atmosphere and vacuum. Another valve controls the connection of the pulsation chambers of the corresponding teat cups with, and their disconnection from, a source of pneumatic pulsations. The third valve controls the connection of the corresponding pail with, and its disconnection from, the milk chambers of the corresponding teat cups. In the embodiment of the invention shown in the patent, the wheels are operable automatically, but the wheels of one series of valves, namely, those effecting the connection and disconnection of the milk chambers of the teat cups with the pails, are also operable manually. Each wheel comprises a hub having four radiating spokes or arms ninety degrees apart. Associated and moving with each wheel is a cam-way. As the platform revolves, a fixed actuator enters the cam-way and turns the wheel a quarter revolution, thereby moving the corresponding valve from its operative position to its inoperative position, or from one operative position to another.

The manual operation of a wheel has been effected by means of a cord or rope connected with the wheel. This operation has been unsatisfactory, since careless operation resulted in rotating the wheel an improper distance, the wheel frequently overrunning its proper position and shifting the valve into an inoperative position.

One of the objects of the present invention is to insure the turning of the wheel approximately that fractional part (preferably a quarter) of a revolution necessary to shift the valve from one desired position to another, the only requirement made of the operator being that he shall pull the cord (or actuate any other substituted manual means that may be provided) to the limit of its movement.

In the drawings, which show a preferred embodiment of the invention:

Fig. 1 is a plan view of two of the wheels with their supporting and actuating means; the novel manually actuating means being applied to only one of the wheels, and being shown as a section on the line 1—1 of Fig. 2. Fig. 2 is a side elevation of the construction shown in Fig. 1. Fig. 3 is an end view of Figs. 1 and 2, looking toward the left. Fig. 4 is a detail plan view of the valve shown at the left hand side of Fig. 2.

The horizontal bar $a$ represents a radial member of a partition between adjacent radial stalls arranged around the rotary platform (not shown) and each adapted to accommodate a cow. To bar $a$ is secured a frame $b$ carrying a tapered valve casing $c$ in which is turnable a tapered plug valve which is operated as hereinafter described.

Turnable in a bearing $e$ in frame $b$ is a shaft $f$, to which is secured a hub $g$ provided with radial arms $2l$, the hub and its radial arms constituting one of the valve-actuating wheels hereinbefore specified. The shaft $f$ carries at its lower end a disc $h$ carrying a pin $i$ which engages a slot in the exposed head of the valve $d$.

The operating wheel is actuated by a frame $k$, which is oscillatable about the bearing $e$. The frame $k$ is turnable slightly more than a quarter turn in one direction (clockwise, Fig. 1) positively and is returnable to its initial operating position by means of a coil spring $m$, one end of which is secured to the bearing $e$ and the other end of which is secured to the frame $k$. In Fig. 1 the frame $k$ is shown in the position to which it has been positively moved. This positive movement is effected by means of a cord $n$, which may be pulled down over a pulley $p$ by the operator, a head $n'$ on the end of the cord $n$ engaging a flange $k'$ on the frame $k$, the positive movement of the cord and consequently of the frame $k$ being limited by the engagement of flange $k'$ with a stop $b'$ secured to frame $b$.

When the frame $k$ is in its normal position, that is, the position which it occupies before it is turned by the cord $n$, it is slightly more than ninety degrees in an anti-clockwise direction from the position shown in Fig. 1. A pawl $o$ carried by the frame is in operative position back of one of the four radial projections $g'$ on the hub $g$. In the turning movement of the frame $k$ (effected by pulling down the cord $n$) the pawl $o$, by reason of its engagement with one of the projections $g'$, turns the hub $g$ into the position shown in Fig. 1.

Secured to the frame $k$ are a cam $r$ and a pin $s$. Pivoted upon the fixed frame $b$ is a lever $t$, which is normally swung out, by means of a spring $u$ into such position that a shoulder $t'$ on the lever is out of the path of movement of any of the projections $g'$ on the hub $g$. When, however, the frame approaches the end of its positive clockwise movement, cam $r$ engages lever $t$ and swings it inward to bring the shoulder $t'$ thereon into the path of movement of one of the projections $g'$, thereby positively limiting the turning movement of the hub $g$, which otherwise would, by momentum, swing substantially beyond the position required to shift the valve $d$ into one or the other of its two positions. Another pawl $v$, pivoted on the fixed frame $b$, is so positioned that, at the end of the positive clockwise movement of hub $g$, it has just cleared one of the projections $g'$ and holds the hub from movement in an anti-clockwise direction.

It will therefore be understood that whenever the cord $n$ is pulled down, it effects a quarter turn of the hub $g$, the shaft $f$ and the valve $d$ and that these elements cannot move substantially beyond a quarter-turn and cannot turn in the opposite direction.

When the pull on the cord $n$ is released, the spring $m$ swings the frame $k$ a quarter turn in an anti-clockwise direction from the position shown in Fig. 2 and into position to be again operated in a clockwise direction when the cord $n$ is again pulled down. In this recessional movement of frame $k$, pin $s$ positively swings lever $t$ outward, so that spring $u$ need be depended upon only to hold lever $t$ in its retracted position after frame $k$ has receded. The extent of this recessional movement of frame $k$ is limited by engagement of a projection $k^2$ on the frame with the hereinafter described cam guide 20 at $k^3$.

If the valve $d$ is intended to connect and disconnect the milk pail with the milk chambers of the corresponding set of teat cups, it will be so constructed that at the end of one quarter turn it will open this connection, at the end of the next quarter turn close the connection, and so on alternately. In Fig. 4 nozzles $w$ and $x$ on the valve chamber are adapted to be respectively connected, through hose (not shown), with the milk pail (not shown) and the milk chambers of the teat cups (not shown); the valve being provided with a radial passage $d'$ which connects these two nozzles, at alternate quarter turns of the valve, and disconnects them at the other alternate quarter turns of the valve.

The valve casing $c$ has a radial arm $y$ which is slidable in a socket in the fixed frame $b$ and is held therein by means of a thumb screw $z$. The arm $y$ is circular in cross-section except for a flattened face as shown in Fig. 4. The receiving socket in the frame $b$ is similarly shaped, thereby insuring that the valve will be entered and held in its socket in proper upright position. A spring-pressed pin 10, carried axially in the shaft $f$, engages a central hole 11 in the head of valve $d$ and presses the valve against its seat in casing $c$. By means of the described construction, the valve casing $c$ and valve $d$ may be readily removed for cleaning and as readily replaced.

The hub $g$ of the operating wheel and its corresponding valve $d$ may be operated automatically by the means described in the hereinbefore mentioned patent, namely: by extending the frame $b$ to form a cam guide 20 within which is adapted to move (relatively) in the direction of the arrow, Fig. 1, an actuator 22 (Fig. 2), which engages one of the radial arms 21 carried by the hub and imparts to the wheel a quarter turn. Actually, as will be understood by what has been hereinbefore stated, the actuators are fixed, while bar $a$ and all the mechanism carried thereby, including frame $b$, frame $k$, and valve $d$ and its actuating wheel, rotates with the platform on which the cows are carried.

Other valve-actuating wheels may be mounted on the bar $a$ or on any other support carried by the platform. In the specified patent two other valve-actuating wheels are shown, one of which controls the passage of pneumatic pulsations to the pulsation chambers of the teat cups, while the other alternately admits air to, and exhausts air from, the pail. In Figs. 1 and 2 another valve-actuating wheel 30 is shown as mounted directly on a shaft carrying a plug valve 31, which is provided with a vacuum passage 33 and an atmospheric port 32. The valve casing has two nozzles 34 and 35 adapted for connection with a milk pail (not shown). 37 is the main vacuum pipe. When the valve 31 is turned to the position shown in Fig. 2, or to a diametrically opposite position, nozzle 35, through passage 33, is in communication with vacuum pipe 37. When the valve 31 is given a quarter turn from either of said positions, nozzle 34 is in communication with atmospheric port 32.

Frame 36 is extended to form a cam guide 38 within which travels (relatively) an actuator 39 adapted to engage one of the radial arms of wheel 30 and turn it ninety degrees on its axis. Since valve 31 is always automatically actuated, manually operable mechanism for actuating it need not be applied thereto.

One of the advantages of the construction shown in Figs. 1, 2, and 3, is that it enables the valve to be accurately operated either manually or automatically; the automatic operation of the valve-actuating wheel always leaving it in proper position to be again operated automatically or manually and its manual operation always leaving it in proper position to be again operated manually or automatically.

What I claim and desire to protect by Letters Patent is:

1. Valve-operating mechanism comprising a valve, a valve-operating shaft, a wheel carried by the shaft, a manually movable frame, means operable in the movement of the frame to turn the wheel and shaft and thereby turn the valve, a lever provided with a stop adapted to limit the movement of the frame, said lever being normally in inoperative position, and means carried by the frame adapted, in its manual movement, to swing said lever into operative position.

2. Valve-operating mechanism comprising a valve-operating shaft, a frame swingable about the shaft, manual means to swing the frame in one direction, a wheel carried by the shaft, a series of projections uniformly disposed around the wheel, a pawl carried by the swinging frame and adapted, in said swinging movement of the frame, to push one of the projections and thereby turn the wheel a distance substantially equal to the distance between adjacent projections, a lever provided with a stop adapted to be interposed in the path of one of said projections, said lever being normally in inoperative position, means carried by the frame adapted, in its manual swinging movement, to move the lever into position to render its stop operative, means to swing the frame in the reverse direction and thereby position the pawl to push another projection of the series when the swinging frame is again manually operated, and means, operative during the reverse movement of the swinging frame, to move said lever into inoperative position.

3. Valve-operating mechanism comprising a valve-operating shaft, a frame swingable about the shaft, manual means to swing the frame in one direction, a wheel carried by the shaft, a series of projections uniformly disposed around the wheel, a pawl carried by the swinging frame and adapted, in said swinging movement of the frame, to push one of the projections and thereby turn the wheel a distance substantially equal to the distance between adjacent projections, a lever provided with a stop adapted to be interposed in the path of one of said projections, said lever being normally in inoperative position, means carried by the frame adapted, in its manual swinging movement, to move the lever into position to render its stop operative, means to swing the frame in the reverse direction and thereby position the pawl to push another projection of the series when the swinging frame is again manually operated, a holding pawl adapted to hold the wheel in the position to which it has been advanced by the swinging frame, and means to return said lever to inoperative position when the swinging frame reverses its movement.

4. Valve-operating mechanism comprising a bodily movable and turnable member provided with radial arms at equal distances apart, a relatively fixed actuator adapted, in the bodily movement of the turnable member, to engage and move one of said arms and thereby turn said member a distance equal to the distance between said arms, a frame oscillatable about the axis of said turnable member and movable in one direction manually, a spring for moving said frame in the opposite direction, means carried by the frame adapted to turn said turnable member a distance equal to that which it is turnable by said fixed actuator, means to positively limit said turning movement of said turnable member, means to hold said turnable member from reversing its movement when said frame is returned by said spring and devices operable by the frame, in its movement in opposite directions, to positively move said movement-limiting means into respectively operative and inoperative positions.

5. Valve-operating mechanism comprising a bodily movable frame, a bearing carried thereby, an upright shaft turning in said bearing, a valve supported on said frame and connected with the shaft so as to turn therewith, an oscillatable frame turnable on said bearing, a wheel secured to said shaft, stops limiting the movement of the oscillatable frame in opposite directions, a cord by means of which the oscillatable frame may be advanced in one direction, a spring by means of which the oscillatable frame is retracted in the other direction when the pull on the cord is released, means, operable in the advance turning movement of the oscillatable frame, to turn the wheel a definite part of a revolution, means, operable by and in the advance movement of the oscillatable frame, to prevent the wheel turning substantially further, and holding means inoperative to prevent said turning movement, of the wheel but operable to prevent a substantial back movement of the wheel after it has been turned as last specified.

6. Valve-operating mechanism comprising a bodily movable frame, a bearing carried thereby, an upright shaft turning in said bearing, a valve supported on said frame and connected with the shaft so as to turn therewith, an oscillatable frame turnable on said bearing, a wheel secured to said shaft, stops limiting the movement of the frame in opposite directions, a cord by means of which the frame may be advanced in one direction, a spring by means of which the frame is retracted in the other direction when the pull on the cord is released, means, operable in the advance turning movement of the frame, to turn the wheel a definite part of a revolution, means to prevent the wheel turning substantially further, the last named means comprising a stop lever movable into operative position in the advance movement of the frame and movable out of operative position in the movement of retraction of the frame so to leave the wheel free to be again turned by the frame in its next advance movement.

7. Valve operating mechanism comprising a valve-operating shaft, a wheel carried by the shaft, an oscillatable frame adapted in its advance movement to positively turn the wheel in one direction and in its return movement to be positioned to again turn the wheel in the same direction, a movable stop adapted to limit the turning movement of the wheel in the direction in which it is turned by said frame, and means operable by said frame in its advance and return movements to move said stop into and withdraw it from operative position.

8. Valve operating mechanism comprising a valve-operating shaft, a wheel carried by the shaft, an oscillatable frame adapted in its advance movement to positively turn the wheel in one direction and in its return movement to be positioned to again turn the wheel in the same direction, a movable stop adapted to limit the turning movement of the wheel in the direction in which it is turned by said frame, and means operable by the frame in its advance and return movements to positively move said stop into and withdraw it from operative position.

9. Valve operating mechanism comprising a valve-operating shaft, a wheel carried by the shaft, an oscillatable frame adapted in its advance movement to positively turn the wheel in one direction and in its return movement to be positioned to again turn the wheel in the same direction, a movable stop adapted to limit the turning movement of the wheel in the direction in which it is turned by said frame, means operable by the frame in its return movement to positively withdraw said stop from operative position, and a spring tending to withdraw said stop from operative position and adapted to hold said stop in inoperative position after said frame, in its return movement, has positively withdrawn said stop from operative position.

10. Valve operating mechanism comprising a valve, a valve-operating shaft, a wheel carried by the shaft, an oscillatable frame, means operable in the advance turning movement of the frame to turn the wheel and shaft and thereby turn the valve, a spring by means of which the frame is retracted, and means to limit the said turning movement of the wheel, the last named means comprising a stop lever movable by the frame into operative position in the advance movement of the frame and movable by the frame out of operative position in the movement of retraction of the frame so as to leave the wheel free to be again turned by the frame in the latter's next advance movement.

11. Valve-operating mechanism comprising a valve, a shaft by means of which said valve is operated, a hub carried by the shaft, an oscillatable frame, manually turnable in one direction, a spring adapted to turn said frame in the opposite direction, means carried by the frame adapted in the turning movement of said frame in one direction, to turn said hub, shaft and valve in one direction, a stop, and a series of members on the hub adapted, in successive movements of said frame in one direction, to successively engage said stop and thereby arrest further turning movement of the hub and shaft after they have completed successive fractional turning movements in said direction and means carried by the frame and operable during its movement in opposite directions to positively move said stop into and out of its said arresting position.

12. Valve-operating mechanism comprising a bodily movable and turnable member provided with radial arms at equal distances apart, a relatively fixed actuator adapted, in the bodily movement of the turnable member, to engage and move one of said arms and thereby turn said member a distance equal to the distance between said arms, a frame oscillatable about the axis of said turnable member, manually operable means to turn the frame in the same direction as it is turnable by said actuator, a spring for moving said frame in the opposite direction, means carried by the frame adapted to turn said turnable member a distance equal to that which it is turnable by said fixed actuator, means to positively limit said turning movement of said turnable member, means to hold said turnable member from reversing its movement when said frame is returned by said spring, and stops positively limiting the movement of the oscillatable frame in both directions.

CYRUS HOWARD HAPGOOD.